(12) United States Patent
Sadamitsu et al.

(10) Patent No.: US 11,964,254 B2
(45) Date of Patent: Apr. 23, 2024

(54) CATALYST DEVICE

(71) Applicants: TOYOTA JIDOSHA KABUSHIKI KAISHA, Aichi-ken (JP); NGK INSULATORS, LTD., Aichi-ken (JP)

(72) Inventors: Takahiro Sadamitsu, Miyoshi (JP); Yoshiyuki Kasai, Kasugai (JP); Yuko Kozaki, Inazawa (JP)

(73) Assignees: TOYOTA JIDOSHA KABUSHIKI KAISHA, Aichi-Ken (JP); NGK INSULATORS, LTD., Aichi-Ken (JP)

( * ) Notice: Subject to any disclaimer, the term of this patent is extended or adjusted under 35 U.S.C. 154(b) by 0 days.

(21) Appl. No.: 17/715,958

(22) Filed: Apr. 8, 2022

(65) Prior Publication Data

US 2022/0323938 A1 Oct. 13, 2022

(30) Foreign Application Priority Data

Apr. 13, 2021 (JP) .................. 2021-067691

(51) Int. Cl.
| | |
|---|---|
| B01J 21/06 | (2006.01) |
| B01J 23/42 | (2006.01) |
| B01J 23/44 | (2006.01) |
| B01J 23/46 | (2006.01) |
| B01J 27/224 | (2006.01) |
| B01J 35/00 | (2006.01) |

(52) U.S. Cl.
CPC ............. *B01J 21/06* (2013.01); *B01J 23/42* (2013.01); *B01J 23/44* (2013.01); *B01J 23/464* (2013.01); *B01J 27/224* (2013.01); *B01J 35/19* (2024.01)

(58) Field of Classification Search
CPC ... B01J 21/06; B01J 23/40; B01J 23/42; B01J 23/44; B01J 23/464; B01J 27/224; B01J 35/0006; B01J 35/04; F01N 3/2013; F01N 3/2026; F01N 3/2803; F01N 3/2839
See application file for complete search history.

(56) References Cited

U.S. PATENT DOCUMENTS

| | | | |
|---|---|---|---|
| 2003/0202917 A1 | 10/2003 | Ashida et al. | |
| 2003/0202918 A1 | 10/2003 | Ashida et al. | |
| 2007/0248507 A1 | 10/2007 | Ashida et al. | |
| 2021/0291113 A1* | 9/2021 | Maeda ................ | F01N 3/2807 |

FOREIGN PATENT DOCUMENTS

| | | | | |
|---|---|---|---|---|
| JP | S56-050715 U | | 5/1981 | |
| JP | H08218856 | * | 8/1996 | ........... F01N 3/2803 |
| JP | H09-164461 A | | 6/1997 | |
| JP | 2001-179110 A | | 7/2001 | |
| JP | 2003-003837 A | | 1/2003 | |
| JP | 2003-311159 A | | 11/2003 | |

OTHER PUBLICATIONS

Machine translation of Komatsuda et al, JP H08218856. (Year: 1996).*

* cited by examiner

*Primary Examiner* — Brian A McCaig
(74) *Attorney, Agent, or Firm* — HAUPTMAN HAM, LLP

(57) ABSTRACT

A catalyst device includes a central axis and a catalyst support. The catalyst support includes a slit that is arranged to be orthogonal to the central axis. The slit is arranged to be symmetrical with respect to an arbitrary plane that includes the central axis.

8 Claims, 7 Drawing Sheets

CATALYST DEVICE

RELATED APPLICATIONS

The present application claims priority of Japanese Application Number 2021-067691 filed on Apr. 13, 2021, the disclosure of which is hereby incorporated by reference herein in its entirety.

BACKGROUND

1. Field

The present disclosure relates to a catalyst device.

2. Description of Related Art

A catalyst device is arranged, for example, in an exhaust passage of an internal combustion engine, and includes a catalyst support that supports a catalyst. For example, Japanese Laid-Open Patent Publication No. 2003-311159 discloses a catalyst device that includes a catalyst support. The catalyst support has a slit that extends across cells. The slit reduces thermal stress that acts on the catalyst support.

The slit is not arranged to be symmetrical with respect to an arbitrary plane that includes a central axis of the catalyst support. Thus, in a section of the catalyst support in which the slit is provided, the slit reduces thermal stress unevenly in the radial direction of the catalyst support. Such an uneven distribution of thermal stress may damage the catalyst support.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one aspect of the present disclosure, a catalyst device is provided that includes a catalyst support including a central axis. The catalyst support includes a slit that is arranged to be orthogonal to the central axis. The slit is arranged to be symmetrical with respect to an arbitrary plane that includes the central axis.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A catalyst device 10 according to one embodiment will now be described with reference to FIGS. 1 to 5C. The catalyst device 10 of the present embodiment is an electrically heated catalyst device that is installed in an exhaust passage of an internal combustion engine mounted, for example, on a vehicle in order to purify exhaust gas of the internal combustion engine.

<Structure of Catalyst Device>

Figure 1:
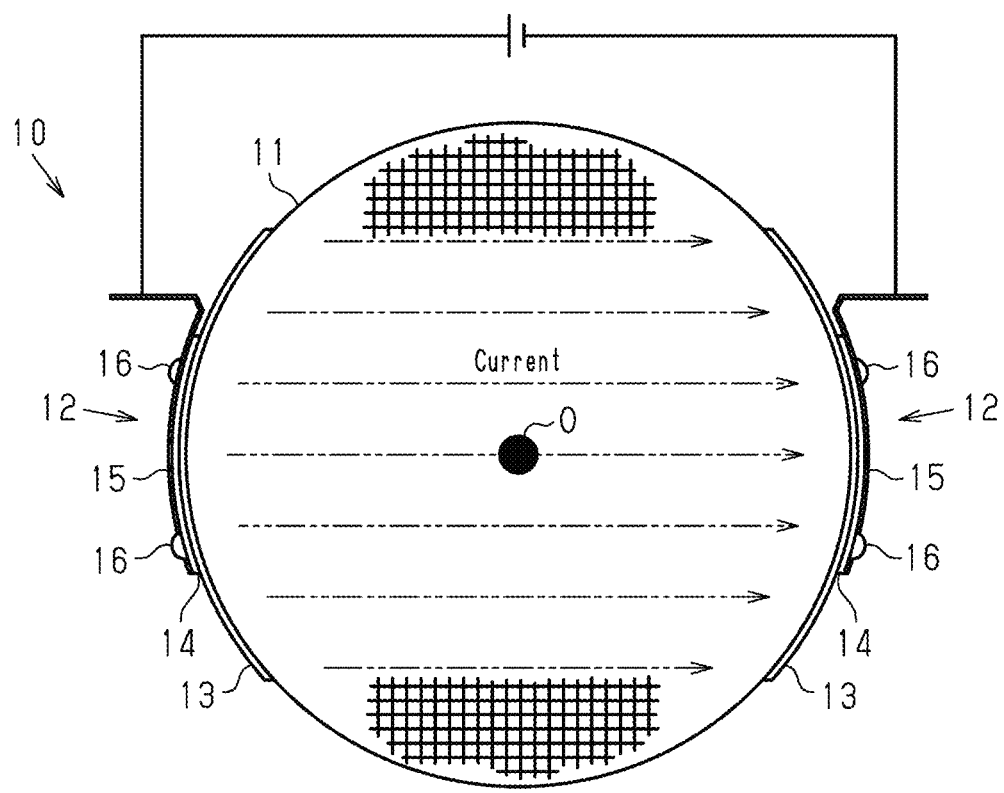
FIG. 1 is a front view of a catalyst device according to one embodiment.

The structure of the catalyst device 10 will now be described with reference to FIGS. 1 and 2.

The catalyst device 10 includes a cylindrical catalyst support 11. In the following description, a direction in which a central axis O of the cylindrical shape of the catalyst support 11 will be referred to as an axial direction A of the catalyst support 11.

The catalyst support 11 has a monolithic structure with a large number of cell holes extending in the axial direction A through the catalyst support 11. The catalyst support 11 is a sintered body including, for example, a compound of silicon and silicon carbide as a major component. The catalyst support 11 is also a conductor. The inner walls of the cell holes of the catalyst support 11 support metal catalysts of, for example, platinum, palladium, or rhodium. In the following description, the left end of the catalyst support 11 as viewed in FIG. 2 will be referred to as a front end of the catalyst support 11. Also, the right end of the catalyst support 11 as viewed in FIG. 2 will be referred to as a rear end of the catalyst support 11.

The catalyst support 11 includes two electrode portions 12 on a side surface. The electrode portions 12 are on sections in the side surface of the catalyst support 11 that are on opposite sides of the central axis O.

Each of the electrode portions 12 includes a first base layer 13, a second base layer 14, a metal electrode plate 15, and fixing layers 16.

The first base layer 13 is formed to contact the side surface of the catalyst support 11 and is made of ceramic having conductivity.

The second base layer 14 is formed on the surface of the first base layer 13. The second base layer 14 includes a metal matrix and oxide mineral particles dispersed in the metal matrix. For example, a NiCr alloy or a MCrAlY alloy is used as the metal matrix. The letter M represents at least one of Fe, Co, and Ni. The oxide mineral particles include oxide such as silica or alumina as the major component. The oxide mineral particles also include bentonite or mica.

The metal electrode plate 15 is a comb-shaped plate made of conductive metal such as an Fe—Cr alloy. The metal electrode plate 15 is fixed to the surface of the second base layer 14 by the fixing layers 16, which are made of the same material as that of the second base layer 14.

The catalyst device 10 is capable of electrically heating the catalyst support 11. That is, with reference to in FIG. 1, when a voltage is applied between the two electrode portions 12 in order to energize the catalyst support 11, the heat generated by the energization heats the catalyst support 11. When the catalyst device 10 is installed in an internal combustion engine, such electrical heating of the catalyst support 11 promotes a catalytic activity.

The catalyst device 10 is installed in the exhaust passage of the internal combustion engine while being inserted in a case 20.

When the catalyst support 11 is heated to a relatively high temperature through electrical heating or by the heat of exhaust gas, thermal stress is caused in the catalyst support 11. If such thermal stress is excessive, cracks can be caused in the catalyst support 11. The catalyst device 10 according to the present embodiment includes a slit 50 formed in the catalyst support 11 in order to reduce such thermal stress.

<Slit>

Figure 2:
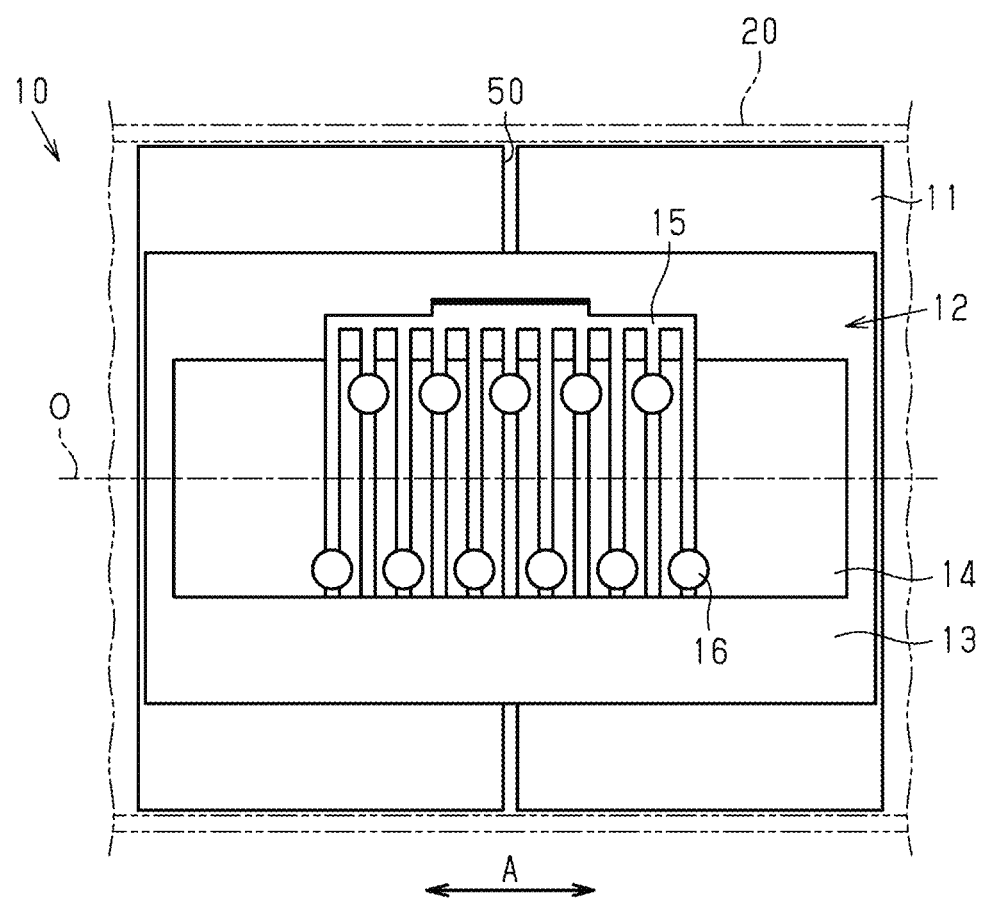
FIG. 2 is a side view of the catalyst device shown in FIG. 1.
Figure 3:
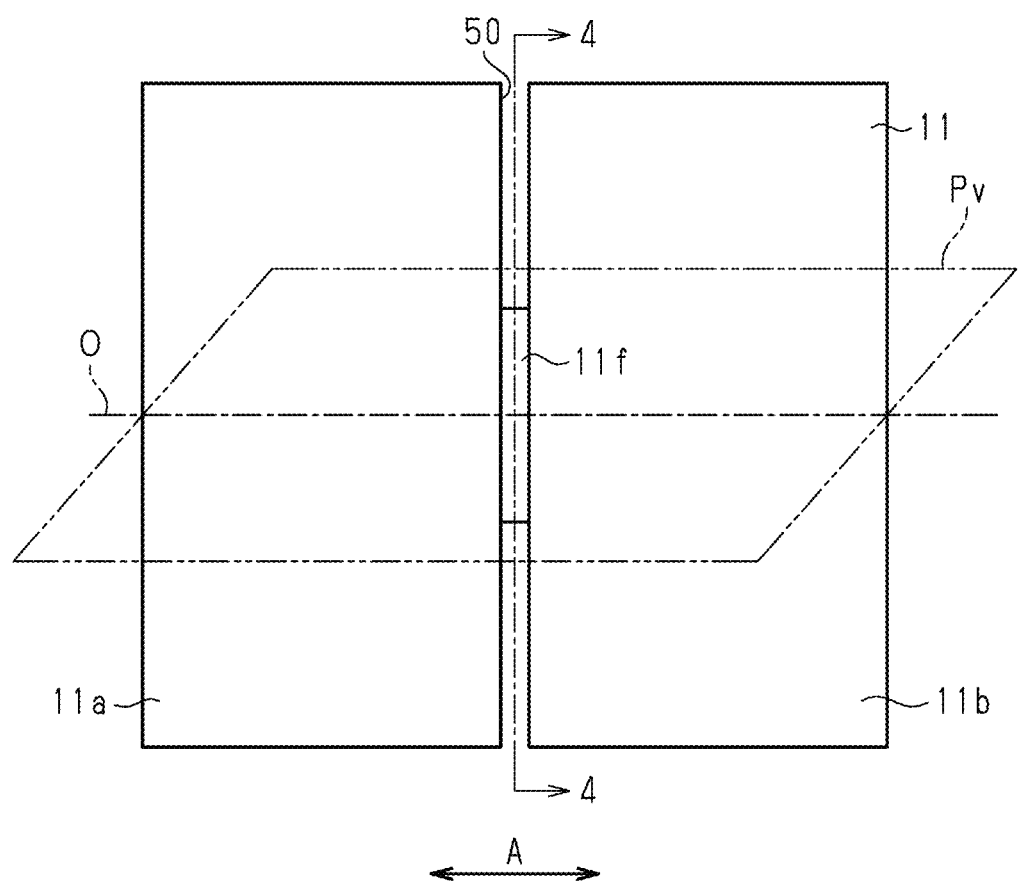
FIG. 3 is a side view of the catalyst support shown in FIG. 2.

As shown in FIGS. 2 and 3, the slit 50 is provided in a middle section in the axial direction A of the catalyst support 11. The slit 50 is formed to extend in a direction orthogonal to the central axis O.

Figure 4:
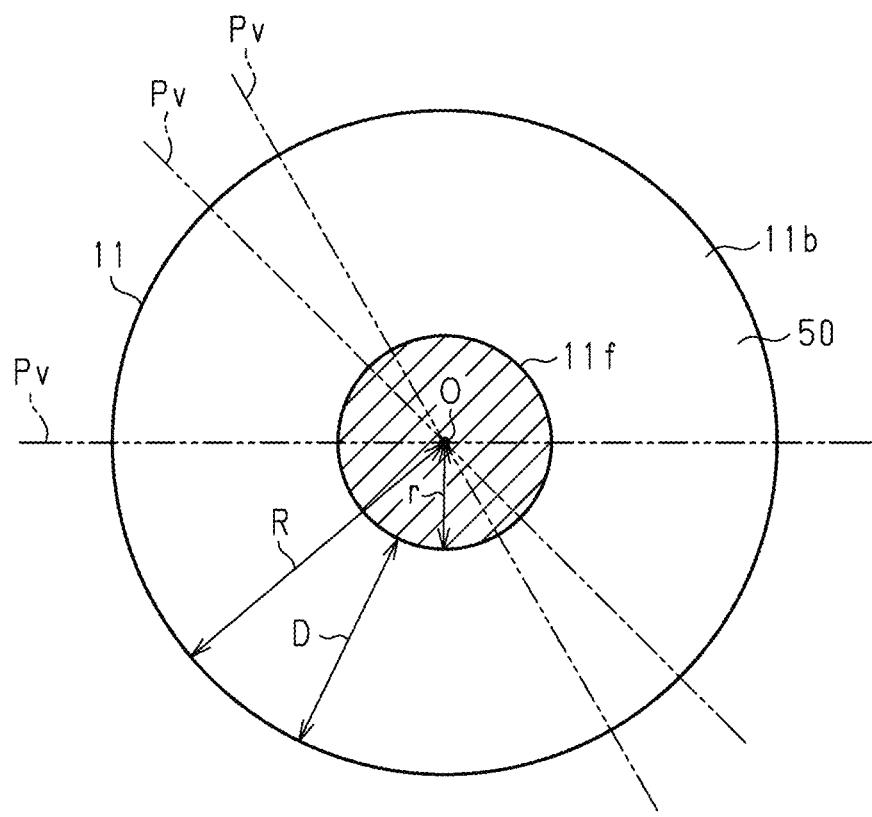
FIG. 4 is a cross-sectional view taken along line 4-4 of FIG. 3, illustrating the catalyst support.

FIG. 4 shows a cross section in the radial direction of a portion of the catalyst support 11 in which the slit 50 is formed. As shown in FIG. 4, the slit 50 is provided to be symmetrical with respect to an arbitrary plane Pv that includes the central axis O. A length D of the slit 50 in the radial direction of the catalyst support 11 is shorter than a length R of the catalyst support 11 in the radial direction. That is, the slit 50 has an annular shape having a center coinciding with the central axis O in the cross section in the radial direction of the catalyst support 11. The catalyst support 11 includes a columnar connecting portion 11f in a central portion in the cross section. The connecting portion 11f has a center coinciding with the central axis O. A radius r of the connecting portion 11f is equal to the difference between the length D and the length R. The slit 50 extends over 360 degrees about the central axis O in a plane orthogonal to the central axis O. The slit 50 opens over 360 degrees in the side surface, that is, the outer circumferential surface, of the catalyst support 11.

As shown in FIG. 3, the catalyst support 11 includes a first segment 11a and a second segment 11b, which are located on opposite sides in the axial direction A of the slit 50. The first segment 11a and the second segment 11b, which are adjacent to each other, are connected to each other by the connecting portion 11f.

A cross-sectional area S of the connecting portion 11f in the radial direction of the catalyst support 11 (area of the hatched section of the connecting portion 11f in FIG. 4) is set in the following manner. The load applied to the catalyst device 10 in the axial direction A of the catalyst device 10 when the catalyst device 10 is inserted into the case 20 is referred to as an insertion load. The cross-sectional area S of the connecting portion 11f is set such that the value obtained by multiplying the withstand load per unit area of the catalyst support 11 by the cross-sectional area S is greater than the insertion load.

<Operation and Advantages of Embodiment>

Operation and advantages of the present embodiment will now be described.

(1) The slit 50 is provided to be symmetrical with respect to the arbitrary plane Pv including the central axis O of the catalyst support 11. Thus, in the section in which the slit 50 is provided, the degree of reduction in thermal stress by the slit 50 is prevented from being uneven in the radial direction of the catalyst support 11. The catalyst support 11 thus will not be damaged by an uneven distribution of thermal stress.

(2) If the catalyst support 11 has a temperature gradient in the axial direction A, the amount of thermal deformation of the catalyst support 11 varies according to the temperature gradient. Accordingly, stress is caused due to such variations in the amount of thermal deformation in the catalyst support 11. Since the stress due to such variations in the amount of thermal deformation is blocked by the slit 50, the stress caused in the catalyst support 11 is reduced.

Figure 5A:
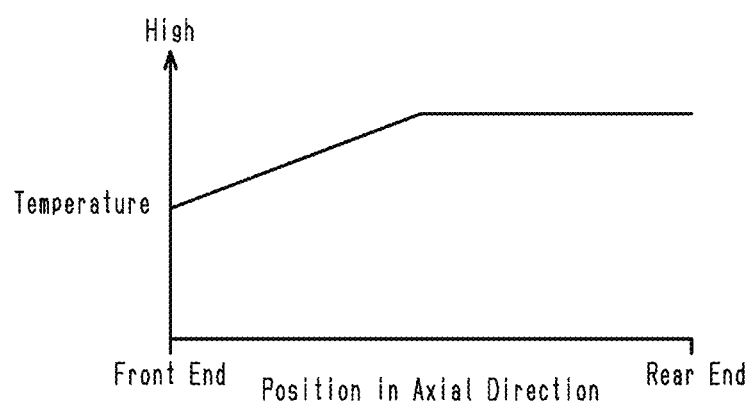
FIGS. 5A to 5C are diagrams showing operation of the catalyst device shown in FIG. 1.
Figure 5B:
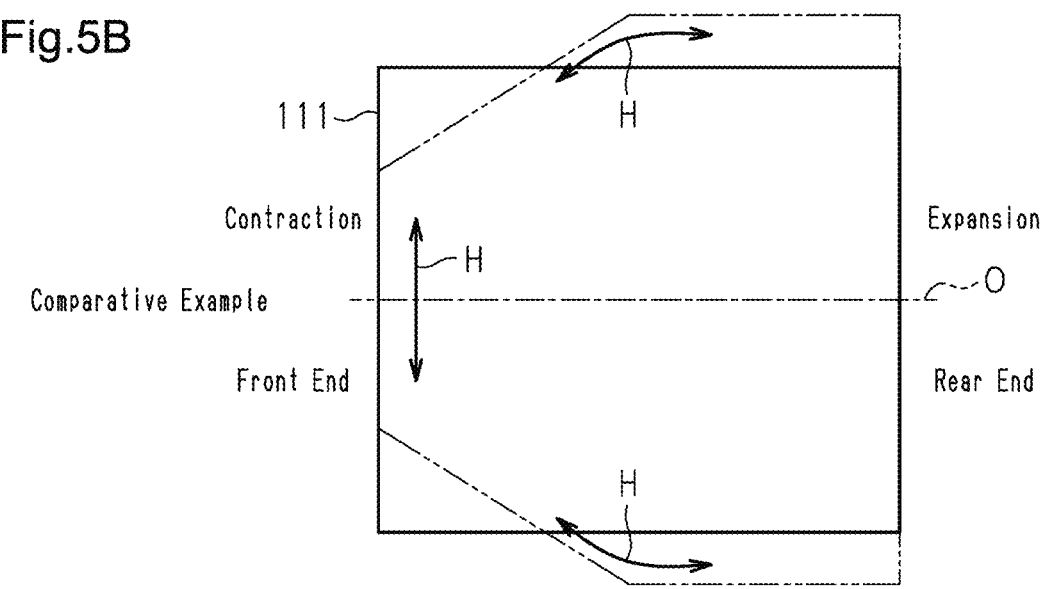
Figure 5C:
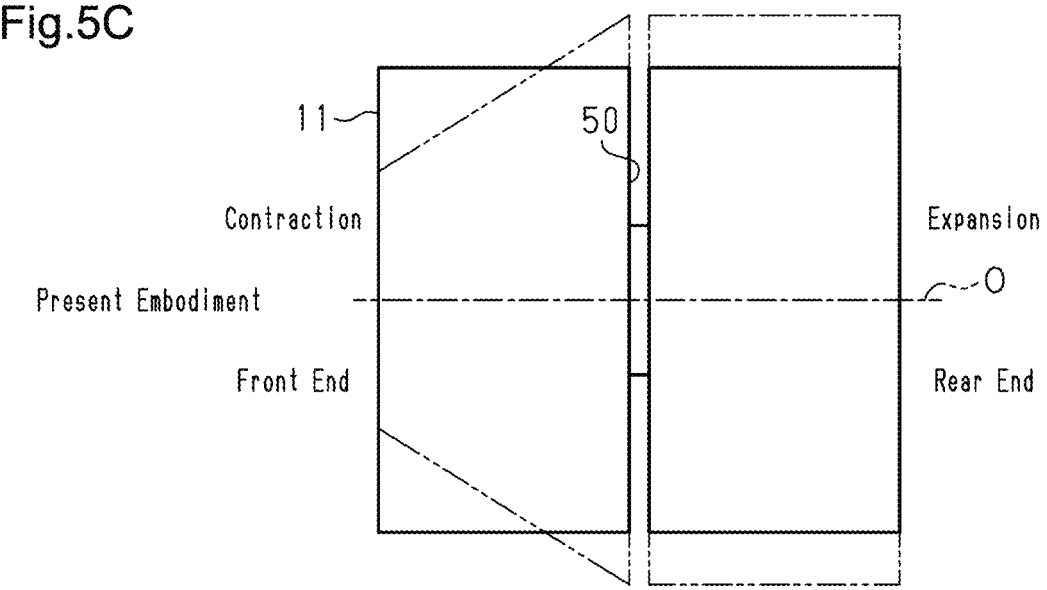

FIGS. 5A to 5C show operational advantages of an example, in which the internal combustion engine is decelerating. FIG. 5A shows a temperature gradient in the axial direction of the catalyst support 11 in a deceleration state. FIG. 5B shows the shape of a catalyst support 111 according to a comparative example for the present embodiment. The catalyst support 111 does not include the slit 50. FIG. 5B also shows the stress in the catalyst support 111. FIG. 5C shows the shape of the catalyst support 11 according to the present embodiment. FIG. 5C also shows the stress in the catalyst support 11. In FIGS. 5B and 5C, the shapes of the catalyst supports at room temperature are represented by the solid lines, and the shapes of the catalyst supports during deceleration are represented by the long-dash double-short-dash lines.

As shown in FIG. 5A, during deceleration, low-temperature exhaust gas flows into the catalyst support 11, so that the temperature in the catalyst support 11 is lower at the front end than at the rear end. Thus, during deceleration, the front ends of the catalyst supports 111, 11 contract, while the rear ends expand, as shown in FIGS. 5B and 5C.

As shown in FIG. 5B, in the catalyst support 111, which does not have the slit 50, tensile stresses H are caused due to the contraction of the front end and the expansion in the rear end. Since the tensile stresses H hinder the contraction at the front end, stress acting on the front end is increased.

In contrast, as shown in FIG. 5C, in the catalyst support 11 of the present embodiment, which includes the slit 50, tensile stresses H caused by the contraction at the front end and the expansion at the rear end are blocked by the slit 50. The tensile stresses H thus do not hinder the contraction at the front end. Therefore, as compared to the comparative example, the catalyst support 11 of the present embodiment reduces the stress acting on the front end of the catalyst support 11, so that the stress caused in the catalyst support 11 is reduced.

(3) The cross-sectional area S is set such that the value obtained by multiplying the withstand load per unit area of the catalyst support 11 by the cross-sectional area S of the connecting portion 11f is greater than the insertion load. This configuration reliably prevents the catalyst device 10 from being damaged when the catalyst device 10 is inserted into the case 20.

(4) In the present embodiment, the catalyst device 10 includes the electrode portions 12, which heat the catalyst support 11, and is thus referred to as an electrically heated catalyst device. The catalyst support 11 includes a conductor. Generally, conductors have higher coefficients of thermal expansion and more susceptible to thermal stress than insulators. In this regard, the electrically heated catalyst device 10 of the present embodiment has the above-described configuration. Accordingly, the electrically heated catalyst device 10, which is susceptible to thermal stress, prevents the catalyst support 11 from being damaged by thermal stress.

The present embodiment may be modified as follows. The present embodiment and the following modifications can be combined as long as the combined modifications remain technically consistent with each other.

Figure 6:
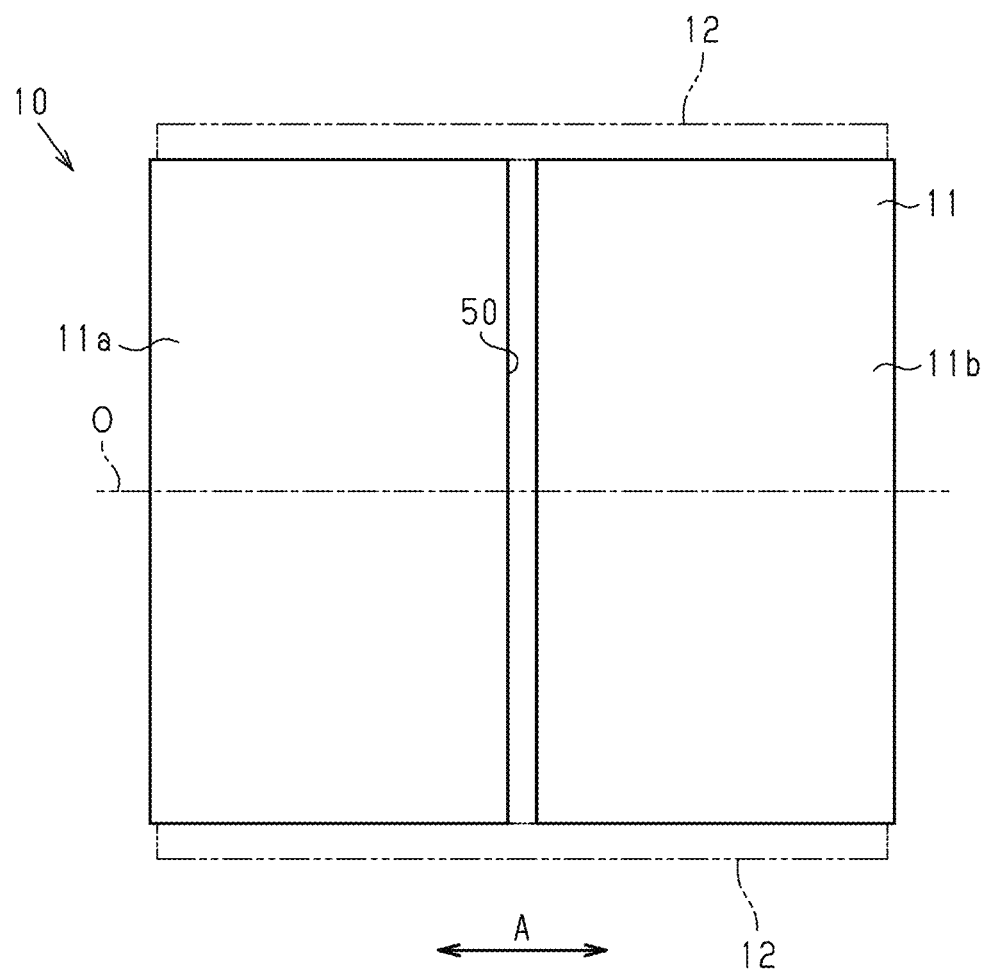
FIG. 6 is a side view of a catalyst device according to a modification.

FIG. 6 shows a modification in which the side surface of the first segment 11a and the side surface of the second segment 11b are connected to each other by the electrode portions 12. In this case, the electrode portions 12 connect the first segment 11a and the second segment 11b to each other. In this case, the connecting portion 11f may be omitted.

Figure 7:
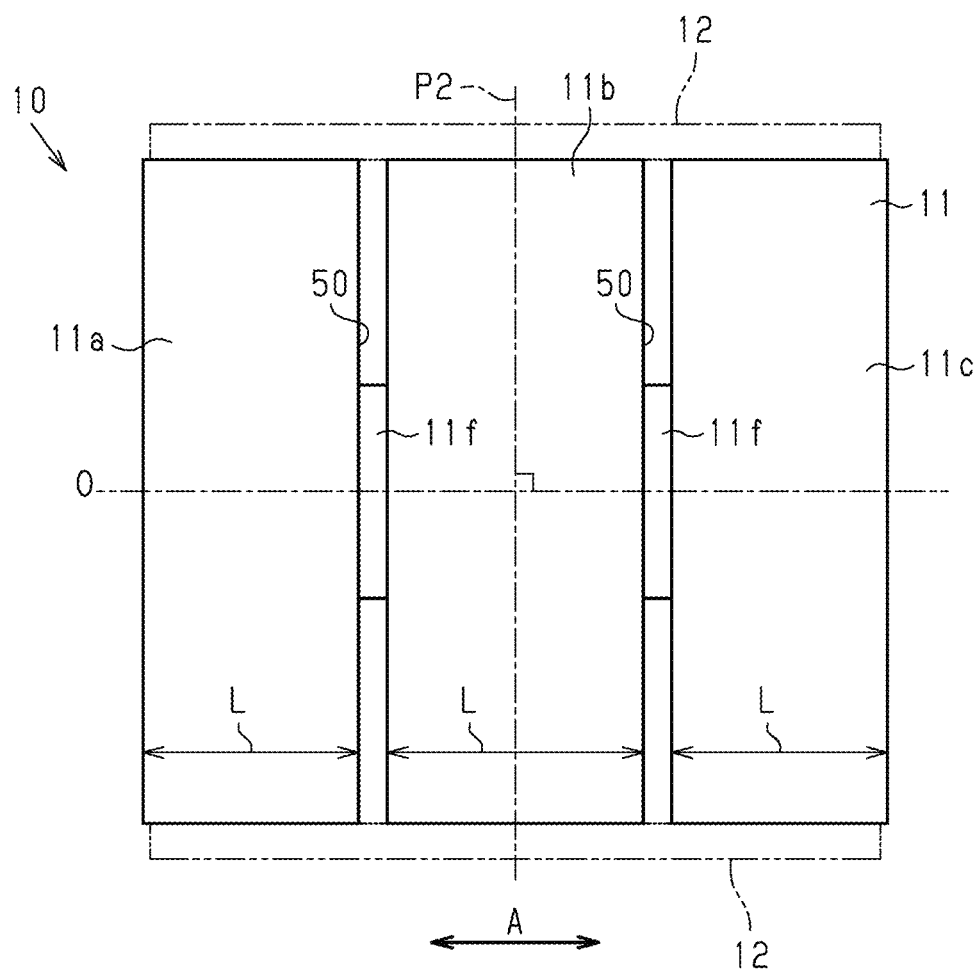
FIG. 7 is a side view of a catalyst device according to another modification.

As shown in FIG. 7, multiple slits 50 may be provided to be arranged in the axial direction A of the catalyst support 11.

In this case, the slits 50 divide the catalyst support 11 into segments 11a, 11b, 11c, a length of which in the axial direction A is shorter than that in a case in which no or one slit 50 is provided. Thus, temperature difference due to a temperature gradient in the axial direction A in each segment is smaller that in a case in which no or one slit 50 is provided. This further reduces the thermal stress caused in the catalyst support 11.

Also, as shown in FIG. 7, a plane that is orthogonal to the central axis O and divides the catalyst support 11 into two equal parts in the axial direction A is referred to as a center plane P2 of the catalyst support 11. The slits 50 may be arranged at positions that are symmetrical with respect to the center plane P2. This modification has the following operational advantages.

That is, when the internal combustion engine is decelerating, exhaust gas of a relatively low temperature flows into the catalyst support 11, so that the temperature in the catalyst support 11 is lower at the front end than at the rear end. In contrast, when the internal combustion engine is accelerating, exhaust gas of a relatively high temperature flows into the catalyst support 11, so that the temperature in the catalyst support 11 is higher at the front end than at the rear end. In this manner, the temperature gradient of the catalyst support 11 can be reversed depending on the operating state of the internal combustion engine. In this respect, if the slits 50 are arranged at positions that are symmetrical with respect to the center plane P2, the stress caused in the catalyst support 11 is reliably reduced even in a case in which the temperature gradient of the catalyst support 11 is reversed.

In the modification shown in FIG. 7, the connecting portions 11f may be omitted if the segments of the catalyst support 11 are connected together by the electrode portions 12.

The shape of the slit 50 may be changed as long as the slit 50 extends in a direction orthogonal to the central axis O of the catalyst support 11 and is symmetrical with respect to the arbitrary plane PV, which includes the central axis O.

It is possible to change the arrangement and structures of the electrode portions 12 in the catalyst support 11.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A catalyst device, comprising:
a catalyst support including a central axis,
wherein
the catalyst support includes a slit that is orthogonal to the central axis,
the slit is symmetrical with respect to an arbitrary plane that includes the central axis, and the slit is orthogonal to the arbitrary plane,
the catalyst support includes:
segments that are located on opposite sides of the slit in a direction in which the central axis extends; and
a connecting portion that connects the segments, which are adjacent to each other, to each other,
a load applied to the catalyst device in a direction in which a central axis of the catalyst device extends when the catalyst device is inserted into a case is an insertion load, and
a cross-sectional area of the connecting portion in a radial direction of the catalyst support is set such that a value obtained by multiplying a withstand load per unit area of the catalyst support by the cross-sectional area is greater than the insertion load.

2. The catalyst device according to claim 1, wherein the slit includes slits that are provided in the direction in which the central axis of the catalyst support extends.

3. The catalyst device according to claim 2, wherein
a plane that is orthogonal to the central axis of the catalyst support and divides the catalyst support into two equal parts in the direction in which the central axis of the catalyst support extends is a center plane of the catalyst support, and
the slits are symmetrical with respect to the center plane.

4. The catalyst device according to claim 1, wherein a length of the slit in the radial direction of the catalyst support is shorter than a length of the catalyst support in the radial direction.

5. The catalyst device according to claim 1, wherein
the catalyst support is a conductor, and
the catalyst device further comprises two electrode portions provided on a side surface of the catalyst support, the electrode portions being configured to heat the catalyst support.

6. The catalyst device according to claim 1, wherein the slit extends over 360 degrees about the central axis of the catalyst support in a plane orthogonal to the central axis of the catalyst support.

7. The catalyst device according to claim 1, wherein a length of the slit in the radial direction of the catalyst support is equal to or more than half of a length of the catalyst support in the radial direction.

8. The catalyst device according to claim 1, wherein
a length of the slit in the radial direction of the catalyst support is larger than a radius of the connecting portion.

* * * * *